United States Patent
Harris et al.

(10) Patent No.: US 10,854,096 B1
(45) Date of Patent: Dec. 1, 2020

(54) THREE-DIMENSIONAL REPRESENTATIONS OF OBJECTS DETECTED BY AN UNMANNED AERIAL VEHICLE

(71) Applicant: Amazon Technologies, Inc., Seattle, WA (US)

(72) Inventors: Scott Raymond Harris, Bainbridge Island, WA (US); Benjamin Griffin Novak, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 16/039,469

(22) Filed: Jul. 19, 2018

Related U.S. Application Data (63) Continuation of application No. 15/160,443, filed on May 20, 2016, now Pat. No. 10,056,001.

(51) Int. Cl.
  *G08G 5/04*  (2006.01)
  *G06T 17/00*  (2006.01)
  *B64C 39/02*  (2006.01)

(52) U.S. Cl.
  CPC .............. *G08G 5/04* (2013.01); *B64C 39/024* (2013.01); *G06T 17/00* (2013.01); *B64C 2201/108* (2013.01); *B64C 2201/123* (2013.01); *B64C 2201/128* (2013.01)

(58) Field of Classification Search
  CPC ........ G08G 5/04; G06T 17/00; B64C 39/024; B64C 2201/123; B64C 2201/128; B64C 2201/108
  See application file for complete search history.

(56) References Cited

U.S. PATENT DOCUMENTS

| | | | |
|---|---|---|---|
| 9,453,914 B2 * | 9/2016 | Stettner | G01S 7/4813 |
| 2015/0015895 A1 * | 1/2015 | Bridges | H04N 13/20 |
| | | | 356/614 |

OTHER PUBLICATIONS

Bonnier, Deni et al., "On the safe use of long range laser active imager in the near-infrared for Homeland Security", 2006, pp. 1-9.
Introduction to Active Imaging, Observ Technologies, Inc., Jul. 5, 2015, pp. 1-7.

* cited by examiner

*Primary Examiner* — Michael V Kerrigan
(74) *Attorney, Agent, or Firm* — Athorus, PLLC (57) ABSTRACT

Described are systems, methods, and apparatus for detecting objects within a distance of an aerial vehicle, and developing a three-dimensional model or representation of those objects. Rather than attempting to use stereo imagery to determine distances and/or depth of objects, the described implementations utilize range-gating, or time-gating, and the known position of the aerial vehicle to develop a three-dimensional representation of objects. For example, when the aerial vehicle is at a first position it may use range-gating to detect an object at a defined distance from the vehicle. The aerial vehicle may then alter its position and use range-gating to detect an object that is the defined distance from the vehicle at the new position. This may be done at several different positions and the resulting information and aerial vehicle position information combined to form a three-dimensional representation of those objects.

19 Claims, 6 Drawing Sheets

FIG. 6

THREE-DIMENSIONAL REPRESENTATIONS OF OBJECTS DETECTED BY AN UNMANNED AERIAL VEHICLE

CROSS-REFERENCE TO RELATED APPLICATIONS

This application is a continuation of and claims priority to U.S. application Ser. No. 15/160,443, filed May 20, 2016, entitled "Three-Dimensional Representations of Objects Detected by an Unmanned Aerial Vehicle," which is incorporated herein by reference in its entirety.

BACKGROUND

Physical delivery of items to user specified delivery destinations has improved dramatically over the years, with some retailers offering next day delivery of ordered items. The final or last mile delivery of physical items to a user specified destination is traditionally accomplished using a human controlled truck, bicycle, cart, etc. For example, a user may order an item for delivery to their home (delivery destination). The item may be picked from a materials handling facility, packed, and shipped to the customer for final delivery by a shipping carrier. The shipping carrier will load the item onto a truck that is driven by a human to the delivery destination and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number appears.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes methods and systems for detecting objects within a defined distance of an aerial vehicle, such as an unmanned aerial vehicle ("UAV"), and developing a three-dimensional representation of those objects. Rather than attempting to use stereo imagery to determine distances and/or depth of objects, the described implementations utilize range-gating, also known as time-gating, and the known position of the aerial vehicle to develop a three-dimensional representation of objects. For example, when the aerial vehicle is at a first position it may use range-gating to detect an object at a defined distance from the vehicle. The aerial vehicle may then alter its position and use range-gating again to detect an object that is the defined distance from the vehicle at the new position. This may be done at several different positions and the resulting information combined to form a three-dimensional representation of those objects.

Such three-dimensional modeling enables object detection in low-light, or no-light conditions, fog, rain, snow, etc. This may be beneficial during aerial vehicle navigation, landing, takeoff, item delivery, etc.

As used herein, a "destination" refers to a place or area to which a payload is to be delivered, and/or a place or area at which a UAV is to land or descend below a defined altitude (e.g., twenty meters).

While the examples discussed herein describe the delivery of a physical object, a digital item may likewise be delivered using one or more of the implementations described herein. For example, a user may order a digital item (e.g., video, audio, electronic book, map) and request that the digital item be delivered via UAV. Using the implementations discussed herein, the digital item may be stored in memory of the UAV, and the UAV may navigate to a destination, descend to a defined altitude, and transmit the digital item to the user or a device (e.g., cell phone, tablet, or laptop) of the user. For example, the UAV may join and/or create a wireless network through which the digital item may be transmitted. In one example, the UAV may establish a local wireless network that the user may temporarily join to receive a transmission of the digital item. In another example, the UAV may join an existing wireless network (e.g., the user's Wi-Fi network) and transmit the digital item to the user's device.

Figure 1:
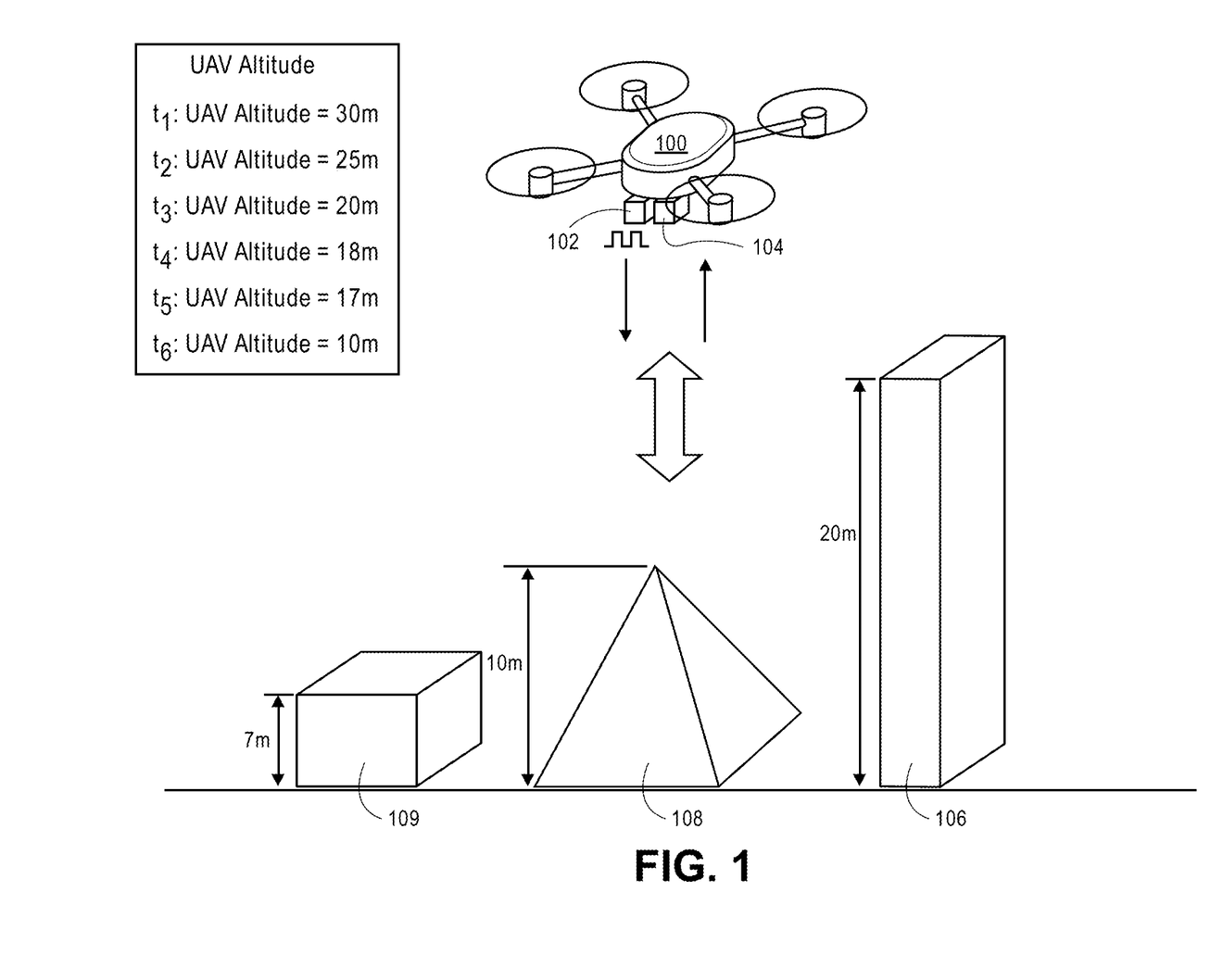
FIG. 1 depicts an environment toward which an aerial vehicle is descending, according to an implementation.

FIG. 1 depicts an environment of an area toward which an aerial vehicle 100 is descending, according to an implementation. As illustrated, the environment includes three objects 106, 108, 109 that extend different heights above a surface. For example, a first object 106 extends approximately twenty meters above the surface, a second object 108 extends approximately ten meters above the surface, and a third object 109 extends approximately seven meters above the surface. While this example utilizes three geometrically shaped objects, it will be appreciated that any number, size, shape and/or configuration of objects may be utilized. For example, if the aerial vehicle is descending toward a delivery destination, the objects may include buildings, trees, lamp posts, tables, chairs, animals, etc. Accordingly, the use of three geometrically shaped objects in the examples is to aid in explanation of the described implementations and it not intended to be limiting in any manner.

As discussed further below with respect to FIG. 5, the aerial vehicle 100 is configured to aerially navigate using one or more propulsion mechanisms. Likewise, the aerial vehicle includes a light emitter 102, such as a pulsed light laser, that is configured to emit a light source away from the aerial vehicle and toward objects that are to be detected. Likewise, the aerial vehicle includes a sensor 104, such as a sensor of a digital camera, and a shutter that opens or closes to allow reflected light to pass the shutter and be collected by the sensor.

Range-gating may be used to detect objects at a defined distance by emitting light, such as a laser light pulse, from the UAV toward an area where object detection is desired. The light will reflect off of objects and return toward the UAV. The shutter remains closed until a defined time when it is opened so that reflected light reaching the UAV at the defined time passes through the shutter and are collected by the sensor. The shutter only remains open for a short period of time and then closes again. In such a configuration, because the speed of light is constant (approximately $3.00 \times 10^8$ m/s), by opening the shutter at a specific time following emission of the light, light that reflects off objects at a defined distance will pass through the shutter and be collected by the sensor. Light reflecting off objects that are closer than the defined distance will reflect and arrive at the UAV before the shutter is opened and thus, will not be collected by the sensor. Likewise, light reflecting off objects that are farther than the defined distance will arrive at the UAV after the shutter has again closed, and thus, will not be collected by the sensor. As a result, the sensor only collects light reflected from objects at the defined distance from the UAV.

In some implementations, the defined distance may be varied by varying the time duration between light emission and opening of the shutter, also referred to herein as sensor activation. A shorter time duration will result in object detection of objects closer to the UAV. A longer time duration will result in object detection of objects further from the UAV.

As another alternative, as described herein, rather than altering the time duration between light emission and sensor activation (through opening of the shutter), the time duration may remain constant and the position of the UAV altered. For example, if the time duration between light emission and sensor activation is such that light reflected from objects approximately ten meters away are detected, each time the UAV moves to a different position and range-gating is performed, objects approximately ten meters from the current position of the UAV will be detected.

For example, returning to FIG. 1, if the UAV is at an altitude of approximately thirty meters, a light is emitted from the light emitter 102 toward the objects 106, 108, 109, and the time duration is set such that the sensor 104 is activated to allow reflected light from objects approximately ten meters away from the aerial vehicle to be collected. In this example, only light reflected by the top of the first object 106 will be collected by the sensor.

Figure 2:
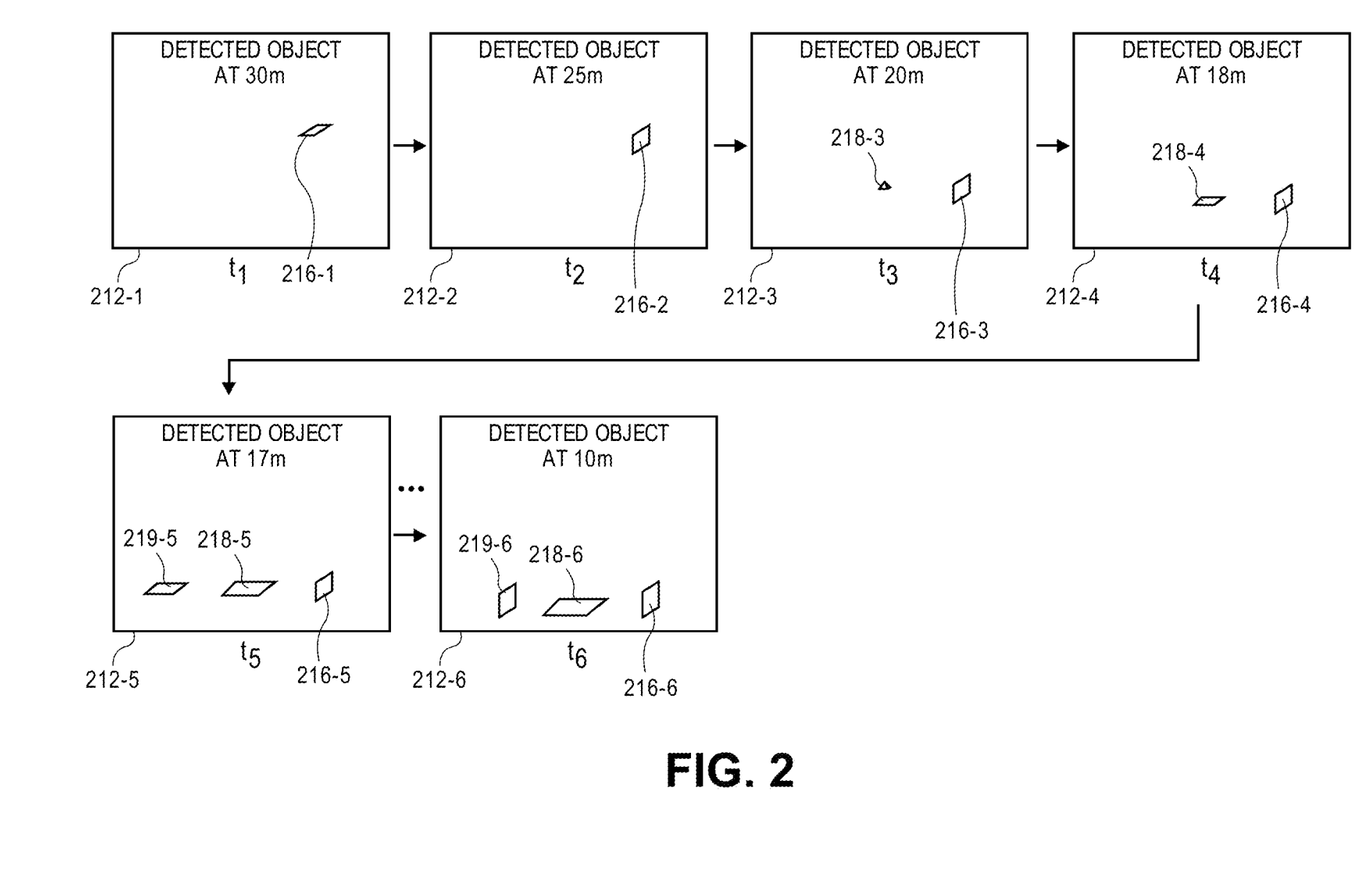
FIG. 2 depicts a series of representations of objects detected at a defined distance from the aerial vehicle at different points in time, according to an implementation.

Turning briefly to FIG. 2, if the aerial vehicle 100 emits light from the light emitter 102 at a first time ($t_1$) and the time duration is such that only light reflected from objects at a defined distance, in this example ten meters, are collected by the sensor, the resulting representation that is formed by the collected light will resemble the first representation 212-1. Specifically, the representation will include the top portion 216-1 of the top of the first object as that is the only portion of an object that is approximately ten meters from the aerial vehicle. Light reflected from the other objects 108, 109 will not reach the aerial vehicle until the sensor is again closed and thus, will not be included in the first representation 212-1.

As the aerial vehicle 100 continues to descend, for example to approximately twenty-five meters at a second time ($t_2$), range-gating is performed again. Because the only object that is approximately ten meters from the aerial vehicle at that altitude is still the first object 106, the only reflected light that will be collected by the sensor when activated will be from a side portion of the first object 106 that is approximately ten meters from the aerial vehicle. The collected light that is reflected from the side portion of the first object 106 is used to form a second representation 212-2 that includes a representation of the side portion of the object 216-2 that is approximately ten meters from the aerial vehicle 100. As indicated in the second representation 212-2, because the top of the first object 106 is less than ten meters from the aerial vehicle at the second time, the reflected light from the top of the first object will pass the aerial vehicle before the sensor is activated. As such, the top of the first object will not be included in the second representation.

As the aerial vehicle continues to descend, at a third time ($t_3$) the aerial vehicle is at an altitude of approximately twenty meters. At this altitude, when range-gating is performed, reflected light from the side of the first object 106 that is approximately ten meters from the aerial vehicle is collected by the sensor and reflected light from the top of the second object 108, which is now approximately ten meters from the aerial vehicle will be collected by the sensor. The collected light is used to form a third representation 212-3 that includes a representation of a side of the first object 216-3 that is approximately ten meters from the aerial vehicle at the third time and the top of the second object 218-3 that is approximately ten meters from the aerial vehicle at the third time.

In the implementations described herein, as the aerial vehicle continues to descend, light pulses are emitted, reflected light from objects at the defined distance (e.g., ten meters) is collected on the sensor, and representations of the objects at the defined distance are formed at each time. The example illustrated in FIGS. 1-2 illustrate collection of six samples at different altitudes at times $t_1$, $t_2$, $t_3$, $t_4$, $t_5$, and $t_6$. Specifically, referring to FIG. 2, as discussed above, a first representation 212-1 that includes a portion of the first object 216-1 that is the defined distance from the aerial vehicle 100 is formed at a first time ($t_1$) when the aerial vehicle is at approximately thirty meters of altitude. A second representation 212-2 that includes a portion of the first object 216-2 that is the defined distance from the aerial vehicle 100 is formed at a second time ($t_2$) when the aerial vehicle is at approximately twenty-five meters of altitude. A third representation 212-3 that includes a portion of the first object 216-3 and a portion of the second object 218-3 that are the defined distance from the aerial vehicle 100 is formed at a third time ($t_3$) when the aerial vehicle is at approximately twenty meters of altitude. A fourth representation 212-4 that includes a portion of the first object 216-4 and a portion of the second object 218-4 that are the defined distance from the aerial vehicle 100 is formed at a fourth time ($t_4$) when the aerial vehicle is at approximately eighteen meters of altitude. A fifth representation 212-5 that includes a portion of the first object 216-5, a portion of the second object 218-5, and a portion of the third object 219-5 that are the defined distance from the aerial vehicle 100 is formed at a fifth time ($t_5$) when the aerial vehicle is at approximately seventeen meters of altitude. Finally, in this example, a sixth representation 212-6 that includes a portion of the first object 216-6, a portion of the second object 218-6, and a portion of the third object 219-6 that are the defined distance from the aerial vehicle 100 is formed at a sixth time ($t_6$) when the aerial vehicle is at approximately ten meters of altitude.

As will be appreciated, any number of representations at any position and/or altitude may be generated using the implementations discussed herein. For example, if a three-dimensional model is formed using the described implementations, range-gating and resulting representations may be formed at every meter, half meter, etc., as the aerial vehicle descends. In a like manner, the implementations described herein may be used to generate three-dimensional representations of objects at any direction with respect to the aerial vehicle. For example, if the aerial vehicle is navigating in a direction that includes a horizontal component, range-gating may be periodically performed in the direction of horizontal flight to detect any objects in that direction and to form a three-dimensional representation of those objects, as discussed below.

In addition to generating representations of objects detected using the light emitter 102 and the sensor 104 that collects reflected light, a three-dimensional representation controller may also obtain position information of the aerial vehicle and correlate that position information with the representations generated for each point in time as the representations are formed.

For example, the three-dimensional representation controller may receive or form the first representation at the first time ($t_1$) and receive from a navigation controller of the aerial vehicle position information about the aerial vehicle at that first time ($t_1$). The position information may include one or more of longitudinal coordinates of the aerial vehicle, latitudinal coordinates of the aerial vehicle, the altitude of the aerial vehicle, the heading or pose of the aerial vehicle, global positioning system (GPS) information, etc. The representation and the position information may then be combined such that the representation includes both a representation of the detected object(s) and a position of those detected objects with respect to the aerial vehicle.

In one example, as each representation 212-1-212-6 is formed, corresponding position information may be associated therewith and the combined representation and position information may be stored in a memory of the aerial vehicle. In some implementations, the position information may be associated with each pixel of the representation, or each pixel of the representation that forms a portion of the representation of the object, such that each pixel has both a color value (from the collected light) and position information.

Figure 3:
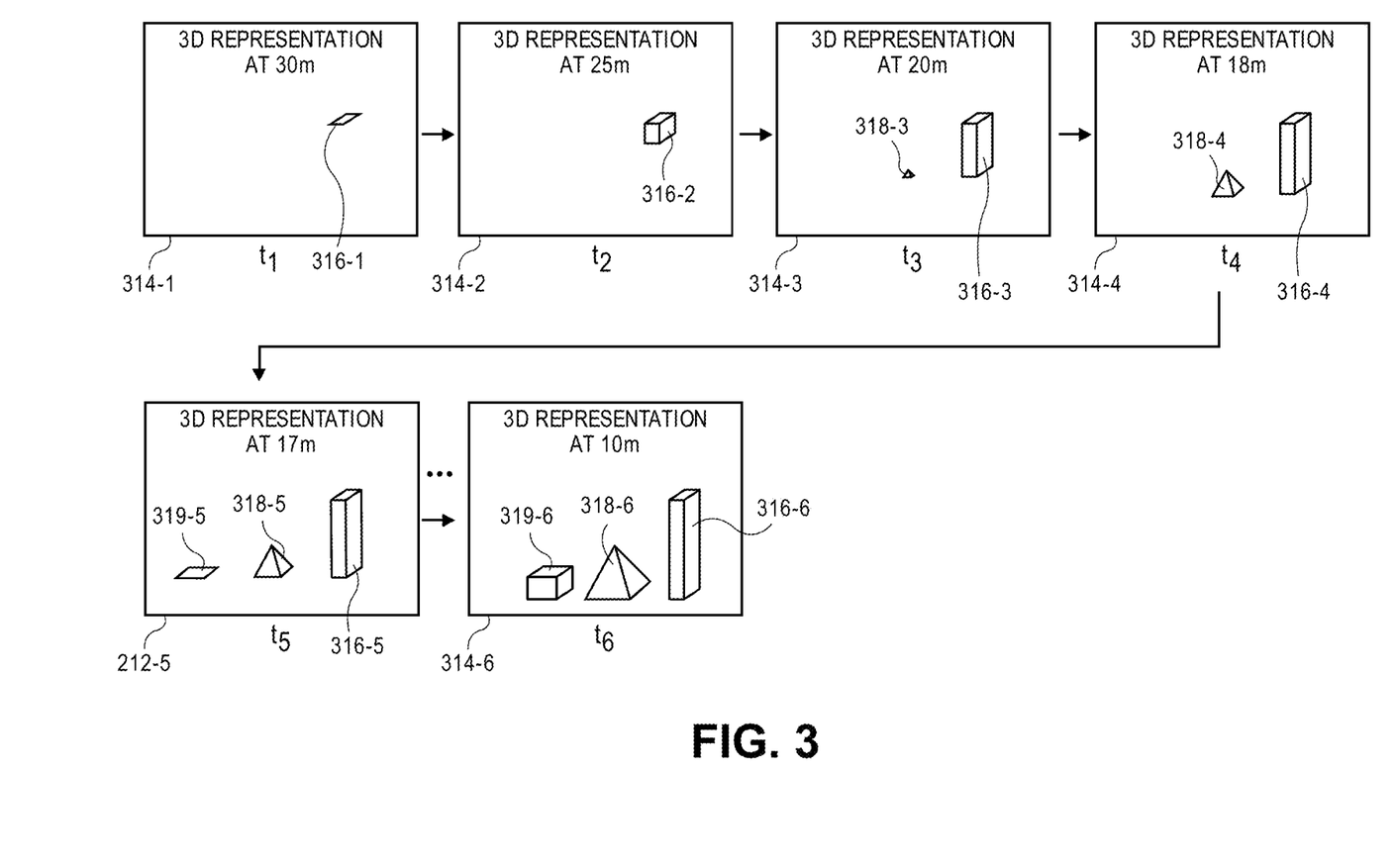
FIG. 3 depicts a series of three-dimensional representations of objects formed from the series of representations of those objects at defined distances at different points in time, according to an implementation.

Turning now to FIG. 3, illustrated is a series of three-dimensional representations formed from the representations discussed above with respect to FIGS. 1-2, according to an implementation. As illustrated, a three-dimensional representation of objects may be formed over a period of time (e.g., $t_1$-$t_6$) by combining the representations of those objects formed from range-gating utilizing the known position of the aerial vehicle when the representations were generated. For example, a first three-dimensional representation 314-1, formed at the first time ($t_1$) only includes the first representation of the first object detected when the aerial vehicle is at the first position (e.g., approximately thirty meters of altitude). At the second time ($t_2$), the first representation and the second representation are combined to form the second three-dimensional representation 314-2 such that a top portion of the first object 316-2 is represented to include both the top of the first object detected at the first time and the side of the first object detected at the second time.

By associating position information with each pixel of the first representation (212-1) and each pixel of the second representation (212-2) from the perspective of the aerial vehicle, the two representations can be combined and the pixels represented based on the corresponding position information to form a three-dimensional representation of the detected portions of the object(s), also known as a point-cloud.

As the aerial vehicle continues to descend and form representations 212-3-212-6 at the different altitudes at each different time, the combined three-dimensional representation, also referred to herein as a combined representation, may be updated to includes the additional information. For example, at the third time, the three-dimensional representation 314-3 is updated to include both the detected portions of the first object 316-3 and the newly detected portion of the second object 318-3. At the fourth time, the fourth representation and corresponding position information is added to the three-dimensional representation 314-4 such that the detected portions of the first object 316-4 and the detected portions of the second object 318-4 are combined to provide a three-dimensional representation of the three detected portions of the two objects, detected between the first time ($t_1$) and the fourth time ($t_4$). At a fifth time ($t_5$) the fifth representation is combined with the three-dimensional representation such that the detected portions of the first object 316-5, detected portions of the second object 318-5, and the detected portion of the third object 319-5 are represented in a three-dimensional representation 212-5. Finally, the sixth representation obtained at the sixth time ($t_6$) is combined with the three-dimensional representation such that the three-dimensional representation 314-6 includes a three-dimensional representation of the first object 316-6, a three-dimensional representation of the second object 318-6, and a three-dimensional representation of the third object 319-6.

Similar to the discussion above, any number of representations with position information may be combined to form a three-dimensional representation of detected objects. Likewise, because the position information may include heading or pose information, even if the aerial vehicle rotates in the x, and/or y direction, position information for the corresponding pixels may be altered to account for the rotation so that the objects represented in the combined representation are appropriately aligned. Likewise, any alternations resulting from a change in the pitch, yaw, and/or roll of the aerial vehicle may likewise be determined from position information and accounted for in the objects represented in the combined representation such that the objects remain appropriately aligned.

Three-dimensional representations of detected objects that are formed using the described implementations may be used to aid an aerial vehicle in object detection and avoidance. Likewise, in some implementations, the formed three-dimensional representations may be stored in a central data stored and associated with the location so that future aerial navigations to that same area can utilize, confirm, and/or update the formed three-dimensional representations.

Figure 4:
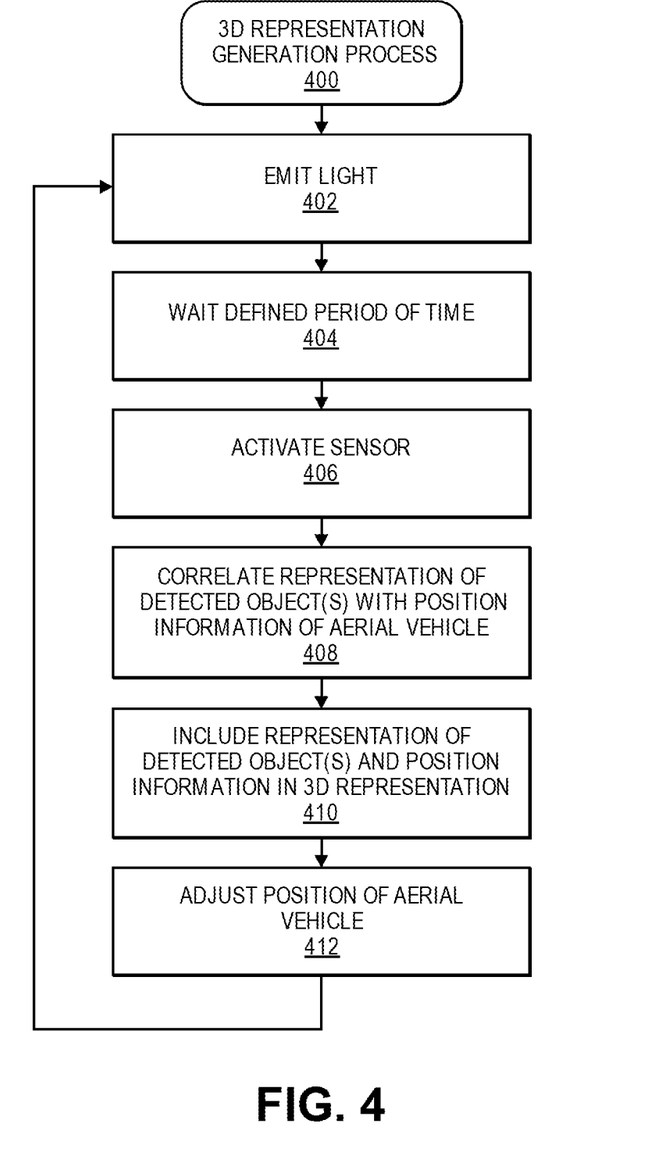
FIG. 4 is a flow diagram illustrating an example three-dimensional image generation process, according to an implementation.

FIG. 4 is a flow diagram illustrating an example three-dimensional image generation process 400, according to an implementation. The process of FIG. 4 and each of the other processes and sub-processes discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by emitting a light from a light emitter positioned on the aerial vehicle, as in 402. The light emitter may be any form of a light emitter, such as a pulsed laser. In one example, a 1,550 nanometer laser that operates in the short-wave infrared ("SWIR") band is utilized so that the emitted light is non-obtrusive. Likewise, the laser may be solid state rather than gas based. In other implementations, other forms of light emitters may be utilized including, but not limited to, laser diodes, light emitting diodes ("LED"), and the like. In some implementations, the light is modulated or pulsed at high speeds (e.g., 100 MHz). In other implementations, single pulses at lower speeds (e.g., 30 MHz) may be utilized.

Upon emitting the light from the light emitter a defined period of time, also referred to herein as a time duration, is allowed to elapse, as in 404, before a sensor on the aerial vehicle is activated, as in 406. The sensor may be any form of sensor that is capable of collecting light. For example, in some implementations, the sensor may be an image sensor of a digital camera. The sensor may be activated by opening a shutter, such as a mechanical or electrical shutter. The sensor may only be activated for a short period of time so that only light reflected from objects at the determined distance from the aerial vehicle are collected by the sensor.

The time duration between light emission and sensor activation may be calculated based on the speed of light and the distance from the aerial vehicle at which objects are to be detected. Specifically, the time duration may be computed as:

$$t_D = 2 * \frac{D}{c}$$

where to is the time duration, D is the determined distance, and c is the speed of light (approximately $3.00 \times 10^8$ m/s). For example, if objects approximately 15 meters from the aerial vehicle are to be detected, the time duration between light pulse emission and sensor activation would be 0.0000001 seconds, or 1.0 microseconds.

The collected light on the sensor forms a representation of the object at the defined distance from the aerial vehicle that reflected the emitted light. Returning to FIG. 4, the representation of the detected object at the defined distance is correlated with the position information of the aerial vehicle at the time at which the representation was formed, as in 408. As discussed above, the position information may include x, y position information (e.g., longitude, latitude) of the aerial vehicle, height or altitude (z) information, pose or heading of the aerial vehicle, etc. Likewise, the position information may be associated with each pixel of the formed representation based on a known field of view of the sensor or the camera that includes the sensor and the position of each pixel.

Utilizing the position information and the representation of the detected object, a three-dimensional representation of the object is formed, as in 410. For example, as each representation is formed at different times and positions of the aerial vehicle, the representations are combined based on the different position information to form a three-dimensional representation of the detected objects. The three-dimensional representation is updated over a period of time as additional representations are obtained. Specifically, the additional representations may be obtained by adjusting the position of the aerial vehicle, as in 412, and returning to block 402 to obtain another representation at the adjusted position of the aerial vehicle.

The example process 400 may be performed periodically at any time during operation of the aerial vehicle. For example, during landing, descent, flight, etc., the example process 400 may be performed to detect objects within a distance of the aerial vehicle. Likewise, objects at different distances from the aerial vehicle may be detected by altering the defined period of time, or time duration between light emission and sensor activation.

Figure 5:
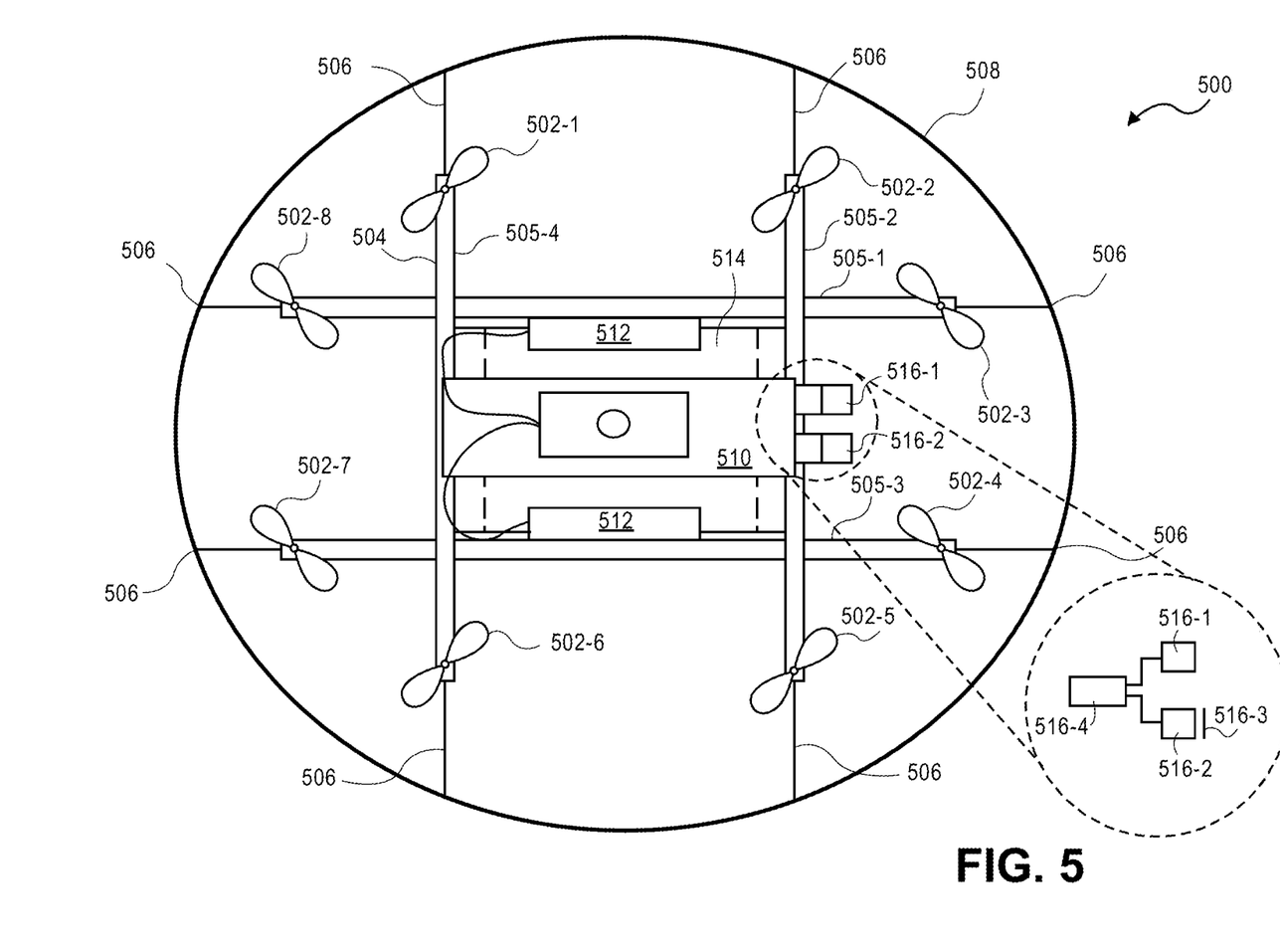
FIG. 5 depicts a block diagram of a top-down view of an unmanned aerial vehicle, according to an implementation.

FIG. 5 illustrates a block diagram of a top-down view of an aerial vehicle 500, such as a UAV, according to an implementation. As illustrated, the aerial vehicle 500 includes eight propellers 502-1, 502-2, 502-3, 502-4, 502-5, 502-6, 502-7, 502-8 spaced about the frame 504 of the aerial vehicle. The propellers 502 may be any form of propeller (e.g., graphite, carbon fiber) and of a size sufficient to lift the aerial vehicle 500 and any inventory engaged by the aerial vehicle 500 so that the aerial vehicle 500 can navigate through the air to a destination, such as a delivery destination. While this example includes eight propellers, in other implementations, more or fewer propellers may be utilized. Likewise, in some implementations, the propellers may be positioned at different locations on the aerial vehicle 500. In addition, alternative methods of propulsion may be utilized as "motors" in implementations described herein. For example, fans, jets, turbojets, turbo fans, jet engines, internal combustion engines, and the like may be used (either with propellers or other devices) to propel the aerial vehicle.

The frame 504 of the aerial vehicle 500 may likewise be of any suitable material, such as graphite, carbon fiber, and/or aluminum. In this example, the frame 504 of the aerial vehicle 500 includes four rigid members 505-1, 505-2, 505-3, 505-4, or beams arranged in a hash pattern with the rigid members intersecting and joined at approximately perpendicular angles. In this example, rigid members 505-1 and 505-3 are arranged substantially parallel to one another and are approximately the same length. Rigid members 505-2 and 505-4 are arranged substantially parallel to one another, yet perpendicular to rigid members 505-1 and 505-3. Rigid members 505-2 and 505-4 are approximately the same length. In some implementations, all of the rigid members 505 may be of approximately the same length, while in other implementations, some or all of the rigid members may be of different lengths. Likewise, the spacing and/or orientation between the two sets of rigid members may be approximately the same or different.

While the implementation illustrated in FIG. 5 includes four rigid members 505 that are joined to form the frame 504, in other implementations, there may be fewer or more components to the frame 504. For example, rather than four rigid members, in other implementations, the frame 504 of the aerial vehicle 500 may be configured to include six rigid members. In such an example, two of the rigid members 505-2, 505-4 may be positioned parallel to one another. Rigid members 505-1, 505-3 and two additional rigid members on either side of rigid members 505-1, 505-3 may all be positioned parallel to one another and perpendicular to rigid members 505-2, 505-4. With additional rigid members, additional cavities with rigid members on all four sides may be formed by the frame 504. As discussed further below, a cavity within the frame 504 may be configured to include an inventory engagement mechanism for the engagement, transport, and delivery of item(s) and/or containers that contain item(s).

In some implementations, the aerial vehicle may be configured to reduce aerodynamic resistance. For example, an aerodynamic housing may be included on the aerial vehicle that encloses the aerial vehicle control system 510, one or more of the rigid members 505, the frame 504, and/or other components of the aerial vehicle 500. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the aerial vehicle 500 so that no additional drag is created during transport of the inventory by the aerial vehicle 500. In other implementations, the inventory may be shaped to reduce drag and provide a more aerodynamic design of the aerial vehicle and the inventory. For example, if the inventory is a container and a portion of the container extends below the aerial vehicle when engaged, the exposed portion of the container may have a curved shape.

The propellers 502 and corresponding propeller motors are positioned at both ends of each rigid member 505. The propeller motors may be any form of motor capable of generating enough speed with the propellers to lift the aerial vehicle 500 and any engaged inventory thereby enabling aerial transport of the inventory.

Extending outward from each rigid member is a support arm 506 that is connected to a safety barrier 508. In this example, the safety barrier is positioned around and attached to the aerial vehicle 500 in such a manner that the motors and propellers 502 are within the perimeter of the safety barrier 508. The safety barrier may be plastic, rubber, etc. Likewise, depending on the length of the support arms 506 and/or the length, number or positioning of the rigid members 505, the safety barrier may be round, oval, or any other shape.

Mounted to the frame 504 is the aerial vehicle control system 510. In this example, the aerial vehicle control system 510 is mounted in the middle and on top of the frame 504. The aerial vehicle control system 510, as discussed in further detail below with respect to FIG. 6, controls the operation, routing, navigation, communication, descent, and the inventory engagement mechanism of the aerial vehicle 500.

Likewise, the aerial vehicle 500 includes one or more power modules 512. In this example, the aerial vehicle 500 includes two power modules 512 that are removably mounted to the frame 504. The power module(s) for the aerial vehicle may be in the form of battery power, solar power, gas power, super capacitor, fuel cell, alternative power generation source, or a combination thereof. The power modules 512 are coupled to and provide power for the aerial vehicle control system 510 and the propeller motors.

In some implementations, one or more of the power modules may be configured such that it can be autonomously removed and/or replaced with another power module while the aerial vehicle is landed. For example, when the aerial vehicle lands at a relay location and/or materials handling facility, the aerial vehicle may engage with a charging member at the location that will recharge the power module. In some implementations, a container may include a power module and when the engagement mechanism of the aerial vehicle engages with the container, the power module of the container may provide power to the aerial vehicle. For example, when an item is being delivered to a delivery location, the power module included in the container may be utilized to power the aerial vehicle, rather than and/or in addition to the power modules 512 of the aerial vehicle 500. When the container is disengaged, the power provided by the container is removed and the aerial vehicle 500 operates using power from the aerial vehicle power module 512.

As mentioned above, the aerial vehicle 500 may also include an inventory engagement mechanism 514. The inventory engagement mechanism may be configured to engage and disengage items and/or containers that hold items (generally referred to as a payload). In this example, the inventory engagement mechanism 514 is positioned within a cavity of the frame 504 that is formed by the intersections of the rigid members 505. In this example, the inventory engagement mechanism is positioned beneath the aerial vehicle control system 510. In implementations with additional rigid members, the aerial vehicle may include additional inventory engagement mechanisms and/or the inventory engagement mechanism 514 may be positioned in a different cavity within the frame 504. The inventory engagement mechanism may be of any size sufficient to securely engage and disengage containers that contain inventory. In other implementations, the engagement mechanism may operate as the container, containing the inventory item(s) to be delivered.

In some implementations, the inventory engagement mechanism 514 may include a retractable cable, pulley, or other member that may be extended or lowered from the aerial vehicle to place an item or a container containing an item at an inventory location. The inventory engagement mechanism communicates with (via wired or wireless communication) and is controlled by the aerial vehicle control system 510.

The aerial vehicle 500 may also include one or more input/output components. For example, the aerial vehicle may include one or more light emitters 516-1 and one or more sensors 516-2, such as a camera, that may be configured to enable range-gating and detection of objects at destinations, delivery locations, etc. The light emitters 516-1 and/or the sensor 516-2 may be mounted on a gimbal that can be used to provide rotation of the light emitter(s) and/or sensor(s) with respect to the aerial vehicle.

Referring to the detailed view illustrated in FIG. 5, and as discussed above, in some implementations, the light emitter 516-1 and sensor 516-2 may be in communication with and/or controlled by a three-dimensional representation controller 516-4. The three-dimensional representation controller may provide signals to the light emitter 516-1 to emit or not emit light, such as pulses of laser light, at specific periods of time. Likewise, the three-dimensional representation controller may determine the time duration that is to elapse before activating the sensor 516-2 and send instructions to the sensor and/or shutter 516-3 to enable or disable activation of the sensor 516-2. As discussed above, the shutter 516-3 may be a mechanical or electronic shutter that can be rapidly opened or closed to enable or block light from passing through and being collected by the sensor.

While the implementations of the aerial vehicle discussed herein utilize propellers to achieve and maintain flight, in other implementations, the aerial vehicle may be configured in other manners. For example, the aerial vehicle may include fixed wings and/or a combination of both propellers and fixed wings. For example, the aerial vehicle may utilize one or more propellers to enable takeoff and landing and a fixed wing configuration or a combination wing and propeller configuration to sustain flight while the aerial vehicle is airborne.

Figure 6:
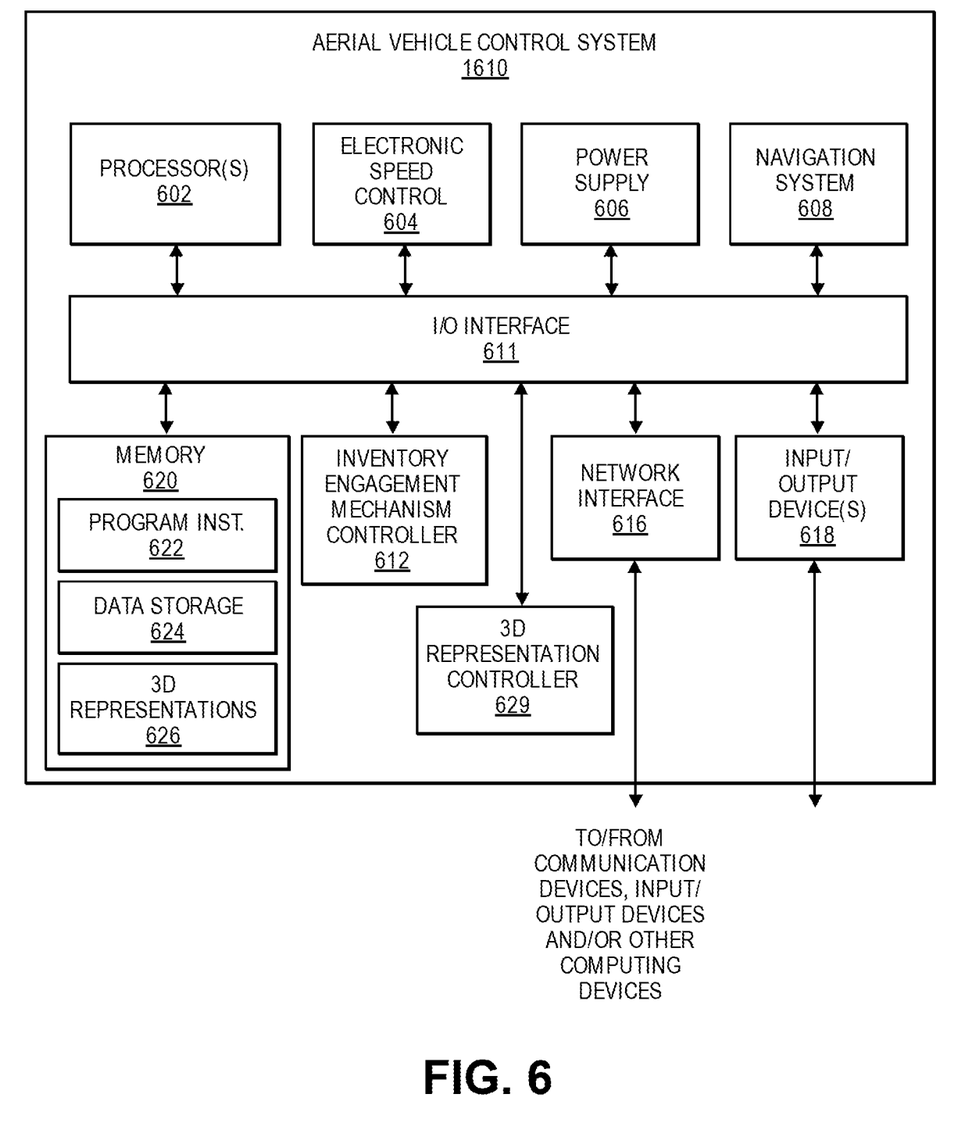
FIG. 6 is a block diagram illustrating various components of an unmanned aerial vehicle control system, according to an implementation.

FIG. 6 is a block diagram illustrating an example aerial vehicle control system 610 of the aerial vehicle 500. In various examples, the block diagram may be illustrative of one or more aspects of the aerial vehicle control system 610 that may be used to implement the various systems and methods discussed above. In the illustrated implementation, the aerial vehicle control system 610 includes one or more processors 602, coupled to a non-transitory computer readable storage medium 620 via an input/output (I/O) interface 611. The aerial vehicle control system 610 may also include a propeller motor controller 604, such as an electronic speed control (ESC), a power module 606, and/or a navigation system 608. The aerial vehicle control system 610 further includes an inventory engagement mechanism controller 612, a network interface 616, and one or more input/output devices 618.

In various implementations, the aerial vehicle control system 610 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, navigation paths, three-dimensional representations, and/or data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624, and three-dimensional representations 626, respectively. In other implementations, program instructions, data, and/or three-dimensional representations may be received, sent, or stored upon different types of computer-accessible media, such as non-transitory media, or on similar media separate from the non-transitory computer readable storage medium 620 or the aerial vehicle control system 610. Generally speaking, a non-transitory, computer readable storage medium may include storage media or memory media such as magnetic or optical media, e.g., disk or CD/DVD-ROM, coupled to the aerial vehicle control system 610 via the I/O interface 611. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 616.

In one implementation, the I/O interface 611 may be configured to coordinate I/O traffic between the processor(s) 602, the non-transitory computer readable storage medium 620, and any peripheral devices, the network interface 611 or other peripheral interfaces, such as input/output devices 618. In some implementations, the I/O interface 611 may perform any necessary protocol, timing or other data transformations to convert data signals from one component (e.g., non-transitory computer readable storage medium 620) into a format suitable for use by another component (e.g., processor(s) 602). In some implementations, the I/O interface 611 may include support for devices attached through various types of peripheral buses, such as a variant of the Peripheral Component Interconnect (PCI) bus standard or the Universal Serial Bus (USB) standard, for example. In some implementations, the function of the I/O interface 611 may be split into two or more separate components, such as a north bridge and a south bridge, for example. Additionally, in some implementations, some or all of the functionality of the I/O interface 611, such as an interface to the non-transitory computer readable storage medium 620, may be incorporated directly into the processor(s) 602.

The propeller motor(s) controller 604 communicates with the navigation system 608 and adjusts the power of each propeller motor to guide the aerial vehicle along a determined navigation path to a destination. The navigation system 608 may include a GPS or other similar system than can be used to navigate the aerial vehicle to and/or from a destination, and/or maintain position information for the aerial vehicle. The inventory engagement mechanism controller 612 communicates with the motor(s) (e.g., a servo motor) used to engage and/or disengage inventory. For example, when the aerial vehicle is positioned over a destination at a defined altitude (or landed), the inventory engagement mechanism controller 612 may provide an instruction to a motor that controls the inventory engagement mechanism to release the inventory.

The three-dimensional representation controller 629 communicates with the navigation system to obtain position information and correlates that position information with representations of objects at defined distances from the aerial vehicle that are used to form three-dimensional representations of the objects, as discussed above. For example, the three-dimensional representation controller 629 may receive GPS information from the navigation system that provides a latitude and a longitude for the aerial vehicle, an altitude of the aerial vehicle, and/or a heading or pose of the aerial vehicle. Such position information may be correlated with representations of objects formed using the implementations discussed above and those representations combined to generate three-dimensional representations of objects detected by the aerial vehicle.

The network interface 616 may be configured to allow data to be exchanged among the aerial vehicle control system 610, other devices attached to a network, such as other computer systems, and/or with aerial vehicle control systems of other aerial vehicles. For example, the network interface 616 may enable wireless communication between numerous aerial vehicles that are transporting inventory to various destinations. In various implementations, the network interface 616 may support communication via wireless general data networks, such as a Wi-Fi network. For example, the network interface 616 may support communication via telecommunications networks such as cellular communication networks, satellite networks, and the like.

Input/output devices 618 may, in some implementations, include one or more displays, image capture devices (e.g. camera, sensors), light emitters, thermal sensors, infrared sensors, time of flight sensors, accelerometers, pressure sensors, weather sensors, microphones, speakers, etc. Multiple input/output devices 618 may be present and controlled by the aerial vehicle control system 610.

As shown in FIG. 6, the storage medium 620 may include program instructions 622 that may be configured to implement the example processes and/or sub-processes described above. The data storage 624 may include various data stores for maintaining data items that may be provided for determining navigation paths, retrieving inventory, landing, identifying a destination, detecting objects, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 610 is merely illustrative and is not intended to limit the scope of the present disclosure. The aerial vehicle control system 610 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 610 may be transmitted to the aerial vehicle control system 610 via transmission media or signals such as electrical, electromagnetic, or digital signals, conveyed via a communication medium such as a wireless network, etc. Various implementations may further include receiving, sending, or storing instructions and/or data implemented in accordance with the foregoing description upon a computer-accessible medium. Accordingly, the techniques described herein may be practiced with other aerial vehicle control system configurations.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method to establish a three-dimensional model of an object, the method comprising:

emitting, at a first time and from a laser positioned on an unmanned aerial vehicle ("UAV"), a first laser pulse from a first position of the UAV;

determining a first time duration following the first time;

activating, at a second time responsive to expiration of the first time duration following the first time, a sensor positioned on the UAV to collect at least a portion of the first laser pulse reflected from a first portion of the object at a distance from the UAV, wherein the sensor is activated at the second time such that reflected portions of the first laser pulse arriving at the sensor between the first time and the second time will not be collected by the sensor;

generating, with the collected at least a portion of the first laser pulse, a first representation that includes at least the first portion of the object;

navigating, at a third time that is subsequent to the second time, the UAV from the first position to a second position;

emitting, at a fourth time that is subsequent to the third time and from the laser positioned on the UAV, a second laser pulse from the second position of the UAV;

determining a second time duration following the fourth time;

activating, at a fifth time responsive to expiration of the second time duration following the fourth time, the sensor positioned on the UAV to collect at least a portion of the second laser pulse reflected from a second portion of the object at the distance from the UAV, wherein the sensor is activated at the fifth time such that reflected portions of the second laser pulse arriving at the sensor between the fourth time and the fifth time will not be collected by the sensor;

generating, with the collected at least a portion of the second laser pulse, a second representation that includes at least the second portion of the object; and combining the first representation and the second representation to form a three-dimensional representation of the object, wherein the first representation and the second representation are combined to form the three-dimensional representation of the object based at least in part on the first position, the second position, and the distance.

2. The method of claim 1, further comprising:

correlating first position information representative of the first position of the UAV at the first time with the first representation; and correlating second position information representative of the second position of the UAV at the fourth time with the second representation;

wherein correlating the first position information with the first representation includes associating different location information with each of a plurality of pixels of the first representation.

3. The method of claim 1, wherein the collected at least a portion of the first laser pulse and the collected at least a portion of the second laser pulse are obtained at different times and at different positions of the UAV.

4. The method of claim 1, further comprising:

navigating, at a sixth time that is subsequent to the fifth time, the UAV to a third position;

emitting, at a seventh time that is subsequent to the sixth time and from the laser positioned on the UAV, a third laser pulse from the third position of the UAV;

determining a third time duration following the seventh time;

activating, at an eighth time responsive to expiration of the third time duration following the seventh time, the sensor positioned on the UAV to collect at least a portion of the third laser pulse reflected from a third portion of the object at the distance from the UAV;

generating, with the collected at least a portion of the third laser pulse, a third representation that includes at least the third portion of the object; and updating the three-dimensional representation of the object based at least in part on the third representation and the third position.

5. A method, comprising:

causing a light emitter of an aerial vehicle to emit light at a first time from a first position;

determining a time duration following the first time;

causing a sensor of the aerial vehicle to, at a second time responsive to expiration of the time duration following the first time, activate and collect light from the light emitter that has reflected from at least a first portion of an object, wherein the at least a first portion of the object is at a distance from the first position of the aerial vehicle at the first time, and wherein the sensor is activated at the second time such that reflected light arriving at the sensor prior to the second time will not be collected by the sensor;

forming, from the reflected light collected by the sensor at the second time, a first representation of the at least a first portion of the object; and forming a three-dimensional representation of the object based at least in part on the first representation, the first position, and the distance.

6. The method of claim 5, further comprising:

causing the light emitter of the aerial vehicle to emit light at a third time;

determining a second time duration following the third time;

causing the sensor of the aerial vehicle to, at a fourth time responsive to expiration of the second time duration following the third time, activate and collect light from the light emitter that has reflected from at least a second portion of the object, wherein the at least a second portion of the object is at the distance from a second position of the aerial vehicle at the third time;

forming, from the reflected light collected by the sensor at the fourth time, a second representation of the at least a second portion of the object; and forming the three-dimensional representation of the object further based at least in part on the second representation and the second position.

7. The method of claim 6, further comprising:

receiving, from a navigation system of the aerial vehicle, first position information and second position information indicative of the first position and the second position of the aerial vehicle at the first time and the third time, respectively.

8. The method of claim 7, further comprising:

correlating the first position information with the reflected light collected at the second time.

9. The method of claim 7, further comprising:

correlating the second position information with the reflected light collected at the fourth time.

10. The method of claim 5, wherein the light emitter is a pulsed laser.

11. The method of claim 5, wherein causing the sensor to activate comprises opening a shutter that is adjacent the sensor such that reflected light is allowed to pass to the sensor through the shutter when opened.

12. The method of claim 5, wherein the distance is dependent upon a speed of light and the time duration between the first time and the second time.

13. The method of claim 5, wherein the light emitted at the first time is a pulse of laser light.

14. A method, comprising:
- determining a distance at which an object is to be detected by an aerial vehicle;
- determining a time duration between a light emission and a light capture such that reflected light of the light emission from the object at the distance will arrive at a sensor of the aerial vehicle;
- causing a light emitter of the aerial vehicle to emit first light at a first time from a first position of the aerial vehicle;
- causing the sensor of the aerial vehicle to activate upon an expiration of the time duration following the first time such that at least a portion of the emitted first light that is reflected by the object is collected by the sensor;
- generating a first representation of the object at the distance based at least in part on the first light collected by the sensor; and
- generating a three-dimensional representation of the object based at least in part on the first representation, the distance, and the first position of the aerial vehicle.

15. The method of claim 14, further comprising:
- causing the light emitter of the aerial vehicle to emit second light at a second time from a second position of the aerial vehicle;
- causing the sensor of the aerial vehicle to activate upon a second expiration of the time duration following the second time such that at least a portion of the emitted second light that is reflected by the object is collected by the sensor;
- generating a second representation of the object at the distance based at least in part on the second light collected by the sensor; and
- generating the three-dimensional representation of the object further based at least in part on the second representation and the second position of the aerial vehicle.

16. The method of claim 15, further comprising:
- determining, using a navigation system of the aerial vehicle, the first position of the aerial vehicle;
- determining, using the navigation system of the aerial vehicle, that the aerial vehicle has moved from the first position to the second position; and
- determining, using the navigation system of the aerial vehicle, the second position of the aerial vehicle.

17. The method of claim 14, further comprising:
correlating the first position of the aerial vehicle and the distance with the first representation, wherein the first representation is representative of a first portion of the object at the distance from the aerial vehicle at the first time.

18. The method of claim 15, wherein:
correlating the second position of the aerial vehicle and the distance with the second representation, wherein the second representation is representative of a second portion of the object at the distance from the aerial vehicle at the second time.

19. The method of claim 14, further comprising:
causing the sensor of the aerial vehicle to deactivate after a defined period of time such that emitted first light that is reflected and arrives at the sensor after the defined period of time is not collected by the sensor.

\* \* \* \* \*